Patented Dec. 27, 1938

2,141,773

UNITED STATES PATENT OFFICE 2,141,773

RECOVERY OF FLUORINE COMPOUNDS FROM WATER VAPOR CONTAINING VOLATILE FLUORINE COMPOUNDS

Walter Strathmeyer, Oppau, Germany, assignor to I. G. Farbenindustrie Aktiengesellschaft, Frankfort-on-the-Main, Germany No Drawing. Application May 19, 1936, Serial No. 80,554. In Germany May 29, 1935

2 Claims. (Cl. 23—88)

The present invention relates to a process for the recovery of fluorine compounds from water vapors containing the same, for example from those obtained when concentrating raw phosphoric acid solutions obtained from crude phosphates.

The phosphoric acid obtained in a dilute form by causing crude phosphates, more particularly those of the apatite type, to react with sulphuric acid usually contains, in addition to other contaminations, about 2 per cent of fluorine (in a combined form) and about 1 per cent of silicic acid. For the recovery, from the said solutions of phosphoric acid, of fluorine which may have a detrimental action on plants when working phosphoric acid up into fertilizers, but is a valuable product which is applicable for a variety of purposes in the form of acids or salts, there has already been proposed to precipitate the fluorine in the form of difficultly soluble calcium or sodium compounds by the addition of soluble calcium or sodium compounds. The precipitates thus obtained, however, are not easily filtered, and can be separated out only with difficulty. Another disadvantage consists in the fact that the precipitate still contains various contaminations, such as gypsum and iron compounds, so that the recovery of pure products requires further dressing.

The fluorine compounds contained in the phosphoric acid are removed therefrom by heating or evaporating the phosphoric acid to a more or less extent. A complete volatilization, however, takes place only at comparatively high concentrations and temperatures. The vapors with which the volatile fluorine compounds which substantially consist of hydrofluoric acid and silicon fluoride escape were hitherto condensed, as for example in cooling towers. By evaporating a phosphoric acid containing for example 60 per cent of water and 2 per cent of fluorine, the aqueous solutions obtained contain at best only 3 per cent of fluorine. The treatment of so diluted hydrofluoric acid involves difficulties and high costs, so that fluorine was so far only recovered in the form of the less valuable fluoro-silicates.

I have now found that condensation products having a substantial content of volatile fluorine compounds can be obtained by washing the vapors containing fluorine with liquids suitable for retaining the combined fluorine, preferably with water or aqueous solutions at temperatures at which no appreciable condensation of the water vapor takes place. The vapors containing fluorine are led for example through one or more receivers which are charged with water and are kept at the required temperature by heat-insulation or gentle heating. The fluorine compounds dissolve in the water of the receiver hydrofluoric acid and fluor-silicic acid being formed, whereas the water vapor escapes chemically unchanged. By this manner it is possible to obtain solutions with 20 per cent and more of fluorine. By using for this purpose solutions of ammonia or salts which will chemically combine with the fluorine compounds, solutions having an even higher content of fluorine may be obtained. When employing ammonia highly soluble ammonium fluoride is formed and silicic acid separates out. The process may be carried out continuously by withdrawing part of the liquid enriched or saturated with fluorine compounds and supplying a corresponding amount of fresh components, the water being obtained by condensation of part of the water vapor after treatment with the retaining liquid.

The process may be applied not only for water vapors containing fluorine compounds, such as results for example in the concentration of dilute phosphoric acid with direct or indirect steam heating, but also in the presence of substantial amounts of other gases. Thus the possibility exists that phosphoric acid may be concentrated by leading in air or hot gases, as for example by means of an immersed burner, which is of importance especially in the production of phosphoric acid of a high state of concentration. In this manner solutions are obtained having more than 20 per cent of fluorine.

The following example serves to illustrate how the present invention is carried out in practice, but the invention is not restricted to this example; the parts are by weight:

Example 225 parts of dilute phosphoric acid containing 32.4 per cent of phosphoric acid, 2.2 per cent of fluorine, 1 per cent of silicic acid and 61.7 per cent of water are concentrated by means of an immersed burner up to a content of 73 per cent of phosphoric acid. The temperature of the concentrated acid is about 150° C. During the said procedure 120 parts of steam and 4.5 parts of fluorine escape in the form of hydrofluoric acid and silicon fluoride. The vapors are led through 2 receivers arranged in series and containing 15 liters of water each which is heated to from 90 to 100° C. At this temperature no appreciable condensation of steam takes place. The first receiver yields 20.4 parts of a solution containing 21 per cent of fluorine, the second receiver yields 15.6 parts of a solution containing 3 per cent of fluorine. In the first receiver 86.5 per cent and in the second receiver 9.5 per cent of fluorine, i. e. 96 per cent in all of the fluorine contained in the dilute phosphoric acid have thus been recovered. When concentrating the next charge of phosphoric acid the second receiver is used as the first receiver and so forth, so that finally the whole fluorine is obtained in the form of a solution which contains at least 20 per cent of fluorine.

What I claim is:—

1. A process for the recovery in concentrated form of a fluorine compound selected from the group consisting of hydrogen fluoride and silicon fluoride which comprises contacting a vaporous mixture containing a relatively small percentage of said fluorine compound and a relatively large percentage of water vapor with an aqueous liquid at a sufficiently elevated temperature so that no appreciable condensation of said water vapor occurs whereby said aqueous liquid retains and becomes enriched in content of said fluorine compound.

2. A process for the recovery in concentrated form of hydrogen fluoride and silicon fluoride from phosphoric acid concentration vapors containing relatively small percentages of said fluorides and relatively large percentages of water vapor which comprises contacting said vapors with an aqueous liquid at a sufficiently elevated temperature so that no appreciable condensation of said water vapor occurs whereby said aqueous liquid retains and becomes enriched in content of said fluorine compounds.

WALTER STRATHMEYER.